(12) United States Patent
Peuhkurinen et al.

(10) Patent No.: US 11,228,745 B2
(45) Date of Patent: Jan. 18, 2022

(54) DISPLAY APPARATUS AND METHOD OF CORRECTING IMAGE DISTORTION THEREFOR

(71) Applicant: Varjo Technologies Oy, Helsinki (FI)

(72) Inventors: Ari Antti Peuhkurinen, Helsinki (FI); Thomas Carlsson, Vantaa (FI)

(73) Assignee: Varjo Technologies Oy, Helsinki (FI)

( * ) Notice: Subject to any disclaimer, the term of this patent is extended or adjusted under 35 U.S.C. 154(b) by 143 days.

(21) Appl. No.: 16/696,515

(22) Filed: Nov. 26, 2019

(65) Prior Publication Data

US 2021/0160468 A1    May 27, 2021

(51) Int. Cl.
*G02B 27/01* (2006.01)
*H04N 9/31* (2006.01)
*G06T 5/00* (2006.01)
*G03B 21/14* (2006.01)

(52) U.S. Cl.
CPC ....... *H04N 9/3185* (2013.01); *G02B 27/0172* (2013.01); *G03B 21/147* (2013.01); *G06T 5/006* (2013.01); *H04N 9/3147* (2013.01); *H04N 9/3182* (2013.01); *H04N 9/3194* (2013.01)

(58) Field of Classification Search
CPC ............ G02B 27/0172; G02B 27/0101; G02B 2027/0178; H04N 9/3185; H04N 9/3182; H04N 9/3188; G03B 21/147; G06T 5/006
See application file for complete search history.

(56) References Cited

U.S. PATENT DOCUMENTS

| | | |
|---|---|---|
| 2013/0050833 A1 | 2/2013 | Lewis et al. |
| 2013/0120224 A1 | 5/2013 | Cajigas et al. |
| 2013/0235169 A1 | 9/2013 | Kato et al. |
| 2016/0018646 A1 | 1/2016 | Osterhout et al. |
| 2017/0068119 A1 | 3/2017 | Antaki et al. |
| 2018/0096503 A1 | 4/2018 | Kaehler et al. |
| 2019/0222830 A1 | 7/2019 | Edwin et al. |
| 2019/0243448 A1 | 8/2019 | Miller et al. |
| 2019/0349576 A1 | 11/2019 | Yildiz et al. |
| 2020/0143524 A1* | 5/2020 | Selstad .................. G06T 5/006 |

OTHER PUBLICATIONS

International Search Report and Written Opinion of the International Searching Authority, Application No. PCT/FI2020/050733, dated Jan. 29, 2021, 14 pages.

* cited by examiner

*Primary Examiner* — Ryan D Howard
(74) *Attorney, Agent, or Firm* — Ziegler IP Law Group, LLC

(57) ABSTRACT

A display apparatus including first and second displays or projectors that display first and second images for first and second eyes, respectively; first and second portions facing first and second eyes, respectively, first and second portions having first (F-F') and second (S-S') optical axes, respectively; means for tracking positions and orientations of first and second eyes relative to corresponding optical axes, respectively; and processor. The processor or external processor obtains current relative positions and orientations of both eyes; determines first and second transformations for first and second input image frames, respectively, given transformation being applied to correct apparent per-pixel distortions produced when given input image frame is displayed; and applies first and second transformations to generate first and second distortion-corrected image frames, respectively, wherein processor renders first and second distortion-corrected image frames.

12 Claims, 5 Drawing Sheets

DISPLAY APPARATUS AND METHOD OF CORRECTING IMAGE DISTORTION THEREFOR

TECHNICAL FIELD

The present disclosure relates generally to display apparatuses; and more specifically, to display apparatuses comprising first displays or projectors, second displays or projectors, first portions and second portions, means for tracking positions and orientations of user's eyes, and processors. Moreover, the present disclosure also relates to methods of correcting image distortion for the aforesaid display apparatuses.

BACKGROUND

Presently, several technologies (for example, such as virtual reality (VR), augmented reality (AR), mixed reality (MR) and the like) are being used to present interactive extended-reality environments to users. Typically, the users utilize specialized devices (for example, such as a virtual reality device, an augmented reality device, a mixed reality device, and the like) for experiencing and interacting with such extended-reality environments. In use, the user generally wears (namely, supports) the specialized device on his/her head.

Conventional specialized devices employ various equipment in order to generate and render images that constitute the extended-reality environment. Generally, the conventional specialized devices present different views of the images that constitute the extended-reality environment to different eyes of the user. Moreover, the conventional specialized devices are designed to be viewed by both eyes of the user through different optical axes of the specialized devices (corresponding to the different eyes of the user). For this purpose, the conventional specialized devices are typically calibrated according to an interpupillary distance of the user.

However, the conventional specialized devices are unable to accommodate for misplacement and/or misalignment of a given eye of the user relative to its corresponding optical axis. As a result, a distorted view of the extended-reality environment is seen by the given eye. Notably, said relative misplacement and/or misalignment of the given eye may occur due to a given conventional specialized device being improperly worn by the user on his/her head, movement of the given conventional specialized device during use, and the like.

Therefore, in light of the foregoing discussion, there exists a need to overcome the aforementioned drawbacks associated with existing specialized devices that present interactive extended-reality environments.

SUMMARY

The present disclosure seeks to provide a display apparatus. The present disclosure also seeks to provide a method of correcting image distortion for a display apparatus. The present disclosure seeks to provide a solution to the existing problem of image distortion that is introduced on account of misplacement and/or misalignment between a user's eyes and conventional specialized devices. An aim of the present disclosure is to provide a solution that overcomes at least partially the problems encountered in prior art, and provides a display apparatus that displays distortion-corrected images to a user of the display apparatus.

In one aspect, an embodiment of the present disclosure provides a display apparatus comprising:

at least one first display or projector that, in operation, displays first images to be presented to a first eye of a user;

at least one second display or projector that, in operation, displays second images to be presented to a second eye of the user;

a first portion and a second portion that are arranged to face the first eye and the second eye, respectively, the first portion and the second portion having a first optical axis and a second optical axis, respectively;

means for tracking a position and orientation of the first eye and a position and orientation of the second eye relative to the first optical axis and the second optical axis, respectively; and a processor coupled to the at least one first display or projector, the at least one second display or projector and said means, wherein the processor or at least one external processor communicably coupled to the processor is configured to:

obtain a current position and orientation of the first eye and a current position and orientation of the second eye relative to the first optical axis and the second optical axis, respectively;

determine at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector; and apply the at least one first transformation and the at least one second transformation to the at least one first input image frame and the at least one second input image frame to generate at least one first distortion-corrected image frame and at least one second distortion-corrected image frame, respectively, wherein the processor is configured to render the at least one first distortion-corrected image frame and the at least one second distortion-corrected image frame via the at least one first display or projector and the at least one second display or projector, respectively.

In another aspect, an embodiment of the present disclosure provides a method of correcting image distortion for a display apparatus, the display apparatus comprising at least one first display or projector, at least one second display or projector, and a first portion and a second portion arranged to face a first eye and a second eye of a user, respectively, the first portion and the second portion having a first optical axis and a second optical axis, respectively, the method comprising:

tracking a current position and orientation of the first eye and a current position and orientation of the second eye relative to the first optical axis and the second optical axis, respectively;

determining at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector;

applying the at least one first transformation and the at least one second transformation to the at least one first input image frame and the at least one second input image frame to generate at least one first distortion-corrected image frame and at least one second distortion-corrected image frame, respectively; and rendering the at least one first distortion-corrected image frame and the at least one second distortion-corrected image frame via the at least one first display or projector and the at least one second display or projector, respectively.

Embodiments of the present disclosure substantially eliminate or at least partially address the aforementioned problems in the prior art, and enable a user to view images that appear to be free from distortion, irrespective of poses of the user's eyes relative to the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A is a schematic illustration of an optimal position and orientation of a given eye relative to a given optical axis, whereas

FIG. 6A is an exemplary illustration of a given occluded area of a given input image frame when a given eye of a user is at an optimal position and orientation relative to its corresponding optical axis, whereas

Figure 1:
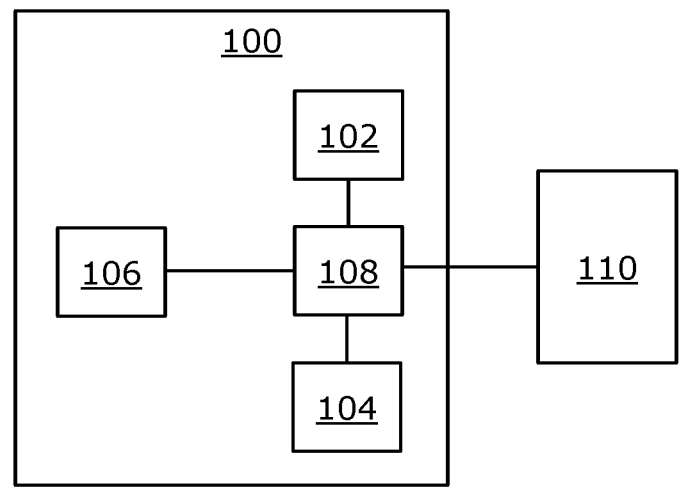
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:

at least one first display or projector that, in operation, displays first images to be presented to a first eye of a user;

at least one second display or projector that, in operation, displays second images to be presented to a second eye of the user;

a first portion and a second portion that are arranged to face the first eye and the second eye, respectively, the first portion and the second portion having a first optical axis and a second optical axis, respectively;

means for tracking a position and orientation of the first eye and a position and orientation of the second eye relative to the first optical axis and the second optical axis, respectively; and a processor coupled to the at least one first display or projector, the at least one second display or projector and said means, wherein the processor or at least one external processor communicably coupled to the processor is configured to:

obtain a current position and orientation of the first eye and a current position and orientation of the second eye relative to the first optical axis and the second optical axis, respectively;

determine at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector; and apply the at least one first transformation and the at least one second transformation to the at least one first input image frame and the at least one second input image frame to generate at least one first distortion-corrected image frame and at least one second distortion-corrected image frame, respectively, wherein the processor is configured to render the at least one first distortion-corrected image frame and the at least one second distortion-corrected image frame via the at least one first display or projector and the at least one second display or projector, respectively.

In another aspect, an embodiment of the present disclosure provides a method of correcting image distortion for a display apparatus, the display apparatus comprising at least one first display or projector, at least one second display or projector, and a first portion and a second portion arranged to face a first eye and a second eye of a user, respectively, the first portion and the second portion having a first optical axis and a second optical axis, respectively, the method comprising:

tracking a current position and orientation of the first eye and a current position and orientation of the second eye relative to the first optical axis and the second optical axis, respectively;

determining at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector;

applying the at least one first transformation and the at least one second transformation to the at least one first input image frame and the at least one second input image frame to generate at least one first distortion-corrected image frame and at least one second distortion-corrected image frame, respectively; and rendering the at least one first distortion-corrected image frame and the at least one second distortion-corrected image frame via the at least one first display or projector and the at least one second display or projector, respectively.

The present disclosure provides the aforementioned display apparatus and the aforementioned method. The described display apparatus accommodates for misplacement and/or misalignment of a given eye of the user relative to its corresponding optical axis. In particular, distortion-corrected image frames are rendered at the display apparatus, wherein the distortion-corrected image frames are generated by applying transformations that are determined based on current poses of the eyes of the user relative to their corresponding optical axes. These distortion-corrected image frames digitally accommodate for any visual artifacts or distortions that would have been visible to the user in the absence of distortion correction. The display apparatus thus provides a truly immersive and realistic extended-reality experience to the user. Furthermore, the external processor may be beneficially used to reduce processing burden on the processor of the display apparatus. As a result, the display apparatus described herein provides better device performance as compared to existing display apparatuses. The method described herein is computationally efficient and simple.

Throughout the present disclosure, the term "display apparatus" refers to a specialized equipment that is configured to present an extended-reality environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and the like) that is operable to present a visual scene of the extended-reality environment to the user. Commonly, the term "display apparatus" is referred to as "head-mounted display apparatus", for the sake of convenience only.

Throughout the present disclosure, the term "extended-reality" encompasses virtual reality, augmented reality, mixed reality, and the like.

Throughout the present disclosure, the term "display" refers to equipment that, in operation, displays a given image that is to be shown to the user of the display apparatus, whereas the term "projector" refers to equipment that, in operation, projects a given image that is to be shown to the user of the display apparatus. Optionally, a given projector projects the given image onto a projection screen or directly onto a retina of a user's eye. It will be appreciated that the term "at least one first display or projector" refers to "one first display or projector" in some implementations, and "a plurality of first displays or projectors" in other implementations. Likewise, the term "at least one second display or projector" refers to "one second display or projector" in some implementations, and "a plurality of second displays or projectors" in other implementations.

Optionally, the at least one first display and/or the at least one second display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one first projector and/or the at least one second projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

In one embodiment, the first images and second images are virtual-reality images. The virtual-reality images, when displayed, present a visual scene of a virtual reality environment to the user.

In another embodiment, the first images and second images are augmented-reality images. The augmented-reality images, when displayed, present a visual scene of an augmented reality environment to the user.

In yet another embodiment, the first images and second images are mixed-reality images. The mixed-reality images, when displayed, present a visual scene of a mixed reality environment to the user.

Throughout the present disclosure, the terms "first portion" and "second portion" refer to different portions of a body of the display apparatus. When the display apparatus in operation is worn by the user, the first portion and the second portion are arranged to face the first eye and the second eye, respectively. Notably, the first portion and the second portion act as different chambers of the display apparatus that house optical components, electrical components and/or mechanical components (of the display apparatus) corresponding to the first eye and the second eye, respectively. As an example, the first portion houses at least the at least one first display or projector, whereas the second portion houses at least the at least one second display or projector. The first optical axis is an optical axis of optics corresponding to the first eye of the user (notably, the at least one first display or projector), whereas the second optical axis is an optical axis of optics corresponding to the second eye of the user (notably, the at least one second display or projector).

Throughout the present disclosure, the term "means for tracking the position and orientation of the first eye and the position and orientation of the second eye" refers to specialized equipment for detecting and/or following positions and orientations of the first and second eyes of the user relative to the first and second optical axes, respectively. Notably, said means for tracking generates relative eye-pose data indicative of pose of the user's eyes relative to the first and second optical axes. In other words, the relative eye-pose data is indicative of pose of the user's eyes relative to the optics of the display apparatus. Herein, the term "pose" encompasses both position and orientation.

It will be appreciated that pose of a given eye relative to a given optical axis is determined as distance of a centre of a pupil of the given eye and/or a centre of the given eye from the given optical axis, when a gaze direction the given eye is straight. In some implementations, the position and orientation of the first eye and the position and orientation of the second eye are tracked separately. In other implementations, the position and orientation of the first eye and the position and orientation of the second eye are tracked together.

It will also be appreciated that the given eye is considered to have an optimal pose relative to the display apparatus when:

the given eye is positioned at a specific spot on the given optical axis in a manner that the given eye lies at a specific distance from corresponding optics of the display apparatus, the specific distance being defined by an optical design of the display apparatus; and an optical axis of the given eye is oriented along the given optical axis.

Therefore, the optimal pose of the given eye relative to the display apparatus is defined by optics setup of the display apparatus, and is pre-known. All other poses of the given eye (namely, all poses other than the optimal pose) are considered to be suboptimal poses of the given eye relative to the display apparatus.

Optionally, a distance of the centre of the pupil of the given eye and/or the centre of the given eye from the specific spot on the given optical axis is determined using at least one mathematical formula. In this regard, the at least one mathematical formula pertains to two-dimensional coordinate geometry or three-dimensional coordinate geometry.

Optionally, an angular separation between an orientation of the given eye and the given optical axis is determined using at least one of: quaternions, Euler angles, a mathematical formula pertaining to two-dimensional coordinate geometry or three-dimensional coordinate geometry.

According to an embodiment, the means for tracking the position and orientation of the first eye and the position and orientation of the second eye is an eye-attached tracking solution. In such a case, said means is implemented as contact lenses with embedded mirrors or sensors.

According to another embodiment, the means for tracking the position and orientation of the first eye and the position and orientation of the second eye is an optical tracking solution. Optionally, in such a case, said means is implemented as: a first illuminator and a second illuminator for emitting light towards the first eye and the second eye, respectively; a first camera for capturing at least one image of the first eye, the first camera being arranged on the first optical axis; and a second camera for capturing at least one image of the second eye, the second camera being arranged on the second optical axis. In such a case, the captured at least one image of the first eye depicts reflections of the emitted light from the first eye, whereas the captured at least one image of the second eye depicts reflections of the emitted light from the second eye. These reflections are commonly referred to as "glints". The emitted light could be infrared light or visible light. In such a case, visual features of the first and second eyes (depicted in images thereof) are used to determine the pose of the first and second eyes relative to the first and second optical axes. Examples of such visual features include, but are not limited to, shapes of pupils, sizes of pupils, positions of pupils with respect to reflections of glints, shapes of irises, sizes of irises, and positions of eye corners.

In an example, when captured images of the first and second eyes depict the shapes of the pupils of said eyes to be circular, said means determines that optical axes of the first and second eyes are oriented along the first and second optical axes, respectively. Alternatively, when captured images of the first and second eyes depict the shapes of the pupils of said eyes to be elliptical, said means determines that optical axes of the first and second eyes are not oriented along the first and second optical axes, respectively. Moreover, a degree of ovalness of these elliptically-shaped pupils is indicative of orientation of the first and second eyes. Furthermore, sizes of irises of said eyes are indicative of distance of the first and second eyes from the display apparatus.

According to yet another embodiment, the means for tracking the position and orientation of the first eye and the position and orientation of the second eye is a display or projector-based tracking solution. In such a case, said means is implemented as the at least one first display or projector, the at least one second display or projector, a first camera corresponding to the first eye, and a second camera corresponding to the second eye. In operation, the at least one first display or projector and the at least one second display or projector display a dot in a centre of a field of view of the first eye and a centre of a field of view of the second eye, respectively, and the first camera and the second camera capture images of their corresponding eyes while the user gazes towards the dots. Said captured images are analysed to determine the pose of the first eye and the second eye relative to the first optical axis and the second optical axis, respectively.

According to still another embodiment, the means for tracking the position and orientation of the first eye and the position and orientation of the second eye is an electric potential measurement-based solution. In such a case, said means is implemented as electrodes placed around the first and second eyes, wherein said electrodes measure electric potentials indicative of the pose of the first and second eyes.

Throughout the present disclosure, the term "processor" refers to hardware, software, firmware or a combination of these. The processor controls overall operation of the display apparatus. In particular, the processor is coupled to and controls operation of the at least one first display or projector, the at least one second display or projector and said means. It will be appreciated that the processor is coupled to various components of the display apparatus and optionally, controls operation of at least some of said components.

Optionally, the processor is implemented as a controller that is configured to control a compositor to perform distortion-correction operations.

Throughout the present disclosure, the term "external processor" refers to a processor that is implemented as a processor of an external computing device. In such a case, the external computing device is communicably coupled to the display apparatus as the at least one external processor is communicably coupled to the processor. The at least one external processor is communicably coupled to the processor wirelessly and/or in a wired manner. It will be appreciated that performing, at the at least one external processor, at least some computational tasks associated with distortion correction is beneficial, as it would considerably reduce processing burden on the processor of the display apparatus. It will be appreciated that the term "at least one external processor" refers to "one external processor" in some implementations, and "a plurality of external processors" in other implementations.

Optionally, the steps of generating and storing pre-calculated correction models (described later) and/or the step of generating real-time correction models (described later) are performed by a first external processor, while the steps of accessing the pre-calculated correction models may be performed by a second external processor.

Optionally, the at least one external processor executes at least one software application that controls an operational behaviour of the display apparatus. Optionally, in this regard, the at least one software application generates the first images and the second images that are to be displayed at the display apparatus.

The processor or the at least one external processor obtains, from the means for tracking the positions and orientations of the first and second eyes, the current position and orientation of the first eye and a current position and orientation of the second eye relative to the first optical axis and the second optical axis, respectively. It will be appreciated that the current positions and orientations of the first and second eyes are obtained repeatedly for a given display apparatus as the pose of the user's eyes relative to the first and second optical axes keeps changing whilst he/she uses the display apparatus. An up-to-date information indicative of the current pose of the user's eyes allows for producing a distortion-correct extended-reality environment for the display apparatus.

Throughout the present disclosure, the term "transformation" refers to an image processing operation pertaining to distortion correction. Since different eyes of the user are to be presented with different images (namely, the first images and the second images), different transformations (namely, distortion corrections) are required to be applied to image frames of these different images. Said transformations are required to be applied since the user's eyes often become misaligned with respect to the display apparatus as the display apparatus is used by the user. Moreover, different users have different inter-pupillary distances, and one eye may be misaligned to a greater extent than the other eye. Therefore, the processor or the at least one external processor determines the at least one first transformation and the at least one second transformation, based on the current position and orientation of the first eye and the current position and orientation of the second eye, respectively. Notably, the at least one first transformation, when applied, corrects apparent per-pixel distortions that would be produced when viewing the at least one first input image frame (without distortion correction) from a perspective of the current pose of the first eye. Likewise, the at least one second transformation, when applied, corrects apparent per-pixel distortions that would be produced when viewing the at least one second input image frame (without distortion correction) from a perspective of the current pose of the second eye.

Throughout the present disclosure, the term "input image frame" refers to an image frame to be displayed (via a given display or projector) if the user's eyes were at optimal poses relative to the display apparatus. Notably, the at least one first input image frame corresponds to the first images to be presented to the first eye, whereas the at least one second input image frame corresponds to the second images to be presented to the second eye.

It will be appreciated that if a given input image frame were displayed, without distortion correction, at a given display or projector while a given eye of the user is has a sub-optimal pose relative to the display apparatus, there would be produced per-pixel distortions that would be apparent to the given eye. Notably, since optical paths of light emanating per pixel of the given input image frame are not parallel, light from each pixel of the given input image frame travels a different optical distance to reach the given eye. In such a case, if the given input image frame were displayed without distortion correction, each pixel of the given input image frame would appear, to the given eye, to have undergone a unique distortion.

In an embodiment, the step of determining the at least one first transformation and the at least one second transformation is performed at a time of calibrating the display apparatus. Typically, the user calibrates the display apparatus according to his/her eyes (for example, according to his/her interpupillary distance) prior to using the display apparatus to view the extended-reality environment. In such a case, optionally, the processor or the at least one external processor is configured to:

control the at least one first display or projector and the at least one second display or projector to display a first reference image and a second reference image, respectively;

control a plurality of cameras to capture images representative of apparent views of the first reference image and a second reference image from a perspective of a plurality of poses of the first eye and the second eye, respectively; and analyze the captured images to determine transformations that are required to correct per-pixel distortions that are produced in the captured images for the plurality of poses.

Furthermore, optionally, the processor or the at least one external processor is configured to generate correction models based on the determined transformations, wherein a given correction model comprises information pertaining to at least one transformation that is required to correct per-pixel distortions corresponding to at least one pose of a user's eye. The processor or the at least one external processor is configured to store the correction models at a memory unit of the display apparatus or the external computing device. In this regard, the correction models are pre-calculated and can be easily accessed when the user uses the display apparatus to view the extended-reality environment. Then, optionally, the at least one first transformation and the at least one second transformation are determined using the pre-calculated correction models.

It will be appreciated that a number of the plurality of poses of the user's eyes is selected in a manner that an amount of data required for the pre-calculated correction models is both sufficient, as well as performance-optimal. In such a case, the pre-calculated correction models comprise information indicative of accurate transformations required for only a limited number of poses of the user's eyes. When the pre-calculated correction models do not include information pertaining to transformation(s) that is/are required for a given pose of a given eye, the required transformation(s) is/are estimated using interpolation of existing information in the pre-calculated correction models.

Additionally or alternatively, in an embodiment, the step of determining the at least one first transformation and the at least one second transformation is performed at a time of using the display apparatus. The pose of the user's eyes relative to the display apparatus changes as the user uses the display apparatus, and the at least one first transformation and the at least one second transformation can be calculated accurately in real time or near-real time whilst the user uses the display apparatus. Optionally, the processor or the at least one external processor is configured to calculate real-time correction models, wherein a given real-time correction model comprises information pertaining to at least one transformation that is required to correct per-pixel distortions corresponding to a current pose of a user's eye. This is especially useful when the poses of the user's eyes relative to the display apparatus change often, as the pre-calculated correction models may not encompass all possible relative poses of the user's eyes.

Optionally, when determining a given transformation, the processor or the at least one external processor is configured to determine, based on a current position and orientation of a given eye relative to a given optical axis of a given portion of the display apparatus, a given two-dimensional offset by which a given pixel of a given input image frame is to be shifted spatially to generate a corresponding pixel of a corresponding distortion-corrected image frame.

Optionally, in this regard, the given pixel of the given input image frame is shifted spatially to generate the corresponding pixel of the corresponding distortion-corrected image frame to account for possible geometric distortion that would be apparent to the given eye if the given input image frame were displayed without distortion correction. It will be appreciated that geometric distortion would cause apparent change in physical attributes (such as shape, size, orientation, and the like) of visual features in the given input image frame. Therefore, the aforesaid spatial shifting of each pixel of the given input image frame is extremely usefully employed to generate the distortion-corrected image frame corresponding to the given input image frame. Said spatial shifting could be understood to be a 'geometric transformation'.

It will be appreciated that different geometric distortions would be produced for different poses of the given eye relative to the given optical axis. Therefore, the given two-dimensional offset is determined on the basis of the current position and orientation of the given eye relative to the given optical axis. This allows for each pixel of the given input image frame to be spatially offset by a required measure, in a manner that when the distortion-corrected image frame is displayed, each pixel is apparent to the user at a required spatial location. As a result, the distortion-corrected image frame viewed by the user is free from geometric distortion.

Hereinabove, the term "two-dimensional offset" refers to offset in two dimensions. For example, the given two-dimensional offset by which the given pixel of the given input image frame is to be shifted spatially may be a horizontal (or X-axis) offset of 5 units and a vertical (or Y-axis) offset of 3 units. It will be appreciated that each pixel of the given input image frame is shifted spatially by a unique measure as light from each pixel undergoes a unique distortion as it travels to reach the given eye of the user.

Optionally, the given two-dimensional offset is to be determined separately for each color channel of the given pixel, based on an amount of wavelength-related aberration. Notably, the given pixel comprises three color channels (notably, a red color channel, a green color channel, and a blue color channel). As a wavelength (or a wavelength range) of light corresponding to each of these color channels is different, there is introduced wavelength-related aberration when light from the given pixel is viewed from a suboptimal pose of the given eye relative to the display apparatus. In particular, the light corresponding to the different color channels of the given pixel undergoes different levels of distortion (owing to their different wavelengths) and appears to be incident at spatially different points even though said light emanates from the same pixel. Therefore, the given two-dimensional offset is determined separately for each color channel of the given pixel, to spatially shift each color channel of the given pixel according to the wavelength or the wavelength range of the light corresponding to each color channel. This provides compensation for chromatic aberration that would be introduced due to wavelength-related aberration.

Optionally, when determining a given transformation, the processor or the at least one external processor is configured to determine, based on a current position and orientation of a given eye relative to a given optical axis of a given portion of the display apparatus, a color-correction factor per color channel of a given pixel of a given input image frame, wherein the color-correction factor, when applied to the given pixel, changes per-color-channel pixel values of the given pixel.

Optionally, in this regard, the given pixel comprises three color channels (notably, a red color channel, a green color channel, and a blue color channel), each of the three color channels being associated with a corresponding pixel value. Herein, the term "pixel value" of a given color channel of the given pixel refers to an intensity of the given color channel. A resultant pixel value of the given pixel is an additive total of pixel values of all constituent color channels of the given pixel. As an example, pixel values of the red color channel, the blue color channel and the green color channel associated with the given pixel may be '64', '224' and '208', respectively. In such an example, the resultant pixel value of the given pixel may be '496', and the given pixel would have a 'turquoise' color.

Optionally, the color-correction factor per color channel of the given pixel of the given input image frame is determined based on the current position and orientation of the given eye relative to the given optical axis. Notably, light corresponding to the different color channels of the given pixel undergoes different degrees of distortion as it reaches the given eye, owing to different wavelengths of light associated with the different color channels. Moreover, for different poses of the given eye, a given color channel of the given pixel would undergo different amounts of distortion as the light associated with the given color channel would travel through different optical paths to be incident upon the given eye. Therefore, the current pose of the given eye relative to the given optical axis is utilized to determine expected per-color-channel distortion for the given pixel as light from the given pixel would travel to reach the given eye, and then the color-correction factor per color channel of the given pixel is determined according to the expected per-color-channel distortion to account for expected color distortion corresponding to the current pose of the given eye. When the color-correction factor per color channel of the given pixel is applied to the pixel values of the given pixel, a resultant pixel value of the given pixel is adjusted in a manner that when light from the given pixel is incident upon the given eye having the current pose relative to the given optical axis, an apparent pixel value of the given pixel is as required. In other words, applying the color-correction factor per color channel compensates for color distortion of the given pixel, to show a required color of the given pixel to the given eye. Such color-correction could be understood to be a 'color transformation' or a 'chromatic transformation'.

It will be appreciated that change in per-color-channel pixel values of the given pixel also compensates for hue (which depends on relative pixel values of the red, blue, and green color channels) of the given pixel.

As an example, color-correction factors associated with the red color channel, the blue color channel and the green color channel of the given pixel having the turquoise color (described in the previous example) may be '0', '−50' and '−38' respectively. Therefore, changed pixel values of the red color channel, the blue color channel and the green color channel of the given pixel would now be '64', '174' and '170', respectively. The changed resultant pixel value of the given pixel may be '408', and the given pixel would have a 'light sea green' color.

The processor or the at least one external processor apply the at least one first transformation and the at least one second transformation to the at least one first input image frame and the at least one second input image frame to generate at least one first distortion-corrected image frame and at least one second distortion-corrected image frame, respectively. Herein, the term "distortion-corrected image frame" refers to an image frame that, when displayed (via a given display or projector), appears to the given eye to be free from any distortions. A given distortion-corrected image frame is generated using at least one given transformation corresponding to a given position and orientation of a given eye of the user. The at least one given transformation compensates for different optical distances that are traveled by light from each pixel of the given distortion-corrected image frame to reach the given eye, in a manner that an apparent view of the given distortion-corrected image frame at the given eye appears is free from any distortion. The at least one given transformation could include at least one of: geometric transformations, color transformations, blending transformations, and the like.

It will be appreciated that different distortion-corrected image frames are required to be generated for different positions and orientations of the given eye.

The at least one first distortion-corrected image frame and the at least one second distortion-corrected image frame are rendered via the at least one first display or projector and the at least one second display or projector, respectively. Notably, the at least one first distortion-corrected image frame corresponds to the first images to be presented to the first eye of the user, whereas the at least one second distortion-corrected image frame corresponds to the second images to be presented to the second eye of the user. Upon rendering the at least one first distortion-corrected image frame and the at least one second distortion-corrected image frame are seen by the user.

Optionally, the at least one first display or projector comprises a first context display or projector and a first focus display or projector, and the at least one second display or projector comprises a second context display or projector and a second focus display or projector, the at least one first distortion-corrected image frame comprising a first distortion-corrected context image frame and a first distortion-corrected focus image frame to be rendered at the first context display or projector and the first focus display or projector, respectively, the at least one second distortion-corrected image frame comprising a second distortion-corrected context image frame and a second distortion-corrected focus image frame to be rendered at the second context display or projector and the second focus display or projector, respectively, wherein the display apparatus further comprises:

a first optical combiner arranged to optically combine a projection of the first distortion-corrected context image frame with a projection of the first distortion-corrected focus image frame to present a first view to the first eye; and a second optical combiner arranged to optically combine a projection of the second distortion-corrected context image frame with a projection of the second distortion-corrected focus image frame to present a second view to the second eye.

Optionally, in this regard, the at least one first display or projector and the at least one second display or projector are implemented as Fovea Contingent Displays (FCDs) or Fovea Contingent Projectors (FCPs) that, in operation, render a foveated visual scene of the extended-reality environment.

Optionally, a display resolution of the first focus display or projector is higher than a display resolution of the first context display or projector. Likewise, optionally, a display resolution of the second focus display or projector is higher than a display resolution of the second context display or projector.

Notably, a given "distortion-corrected focus image frame" is an image frame which corresponds to a region of interest in the visual scene or a part of the region of interest, whereas a given "distortion-corrected context image frame" is an image frame which corresponds to at least a remaining region of the visual scene that is different from the region of interest or the part of the region of interest. Herein, the term "region of interest" refers to a region in the visual scene towards which the user's gaze is directed (namely, focused).

In an embodiment, a given distortion-corrected context image frame represents only that remaining region of the visual scene which is different from the region of interest or the part of the region of interest. In another embodiment, a given distortion-corrected context image frame represents an entirety of the visual scene.

Optionally, the display apparatus further comprises a means for tracking gaze directions of the user's eyes, wherein the processor or the at least one external processor is configured to obtain, from said means, information indicative of the gaze directions of the user's eyes, and determine the region of interest in the visual scene, based on said information. It will be appreciated that a gaze direction of the first eye of the user is different from a gaze direction of the second eye of the user. Optionally, the means for tracking the gaze directions is implemented by way of contact lenses with sensors, cameras monitoring positions of pupils of the user's eyes, and the like. Such means for tracking the gaze directions are well-known in the art.

Throughout the present disclosure, the term "optical combiner" refers to equipment (for example, such as optical elements) for optically combining a projection of a given distortion-corrected context image frame with a projection of a corresponding distortion-corrected focus image frame to present a given view to a given eye. Upon said optical combination, there is produced a combined projection of the given view, wherein the combined projection of the given view is a projection of at least one given distortion-corrected image frame depicting the given view.

Optionally, a given optical combiner allows for optically combining the projection of the given distortion-corrected context image frame with the projection of the corresponding distortion-corrected focus image frame in a manner that a portion of the combined projection of the given view that corresponds to the region of interest is incident upon a fovea of the given eye. It will be appreciated that the given distortion-corrected context image frame and the corresponding distortion-corrected focus image frame are rendered substantially simultaneously in order to avoid time lag during combination of projections thereof.

It will be appreciated that a given optical combiner is arranged on an optical path of a projection of a given distortion-corrected context image frame, as well as on an optical path of a projection of a given distortion-corrected focus image frame.

Hereinabove, the term "projection" refers to a collection of light rays emanating from at least one given display or projector when a given image frame is displayed thereat. A given projection (namely, the collection of light rays) may transmit through and/or reflect from various optical elements of the display apparatus before reaching the user's eyes. The given projection may combine with another projection to form a combined projection. For purposes of embodiments of the present disclosure, the term "projection" has been used consistently, irrespective of whether the collection of light rays is transmitted or reflected.

Optionally, a given optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, the processor or the at least one external processor is configured to:

determine, based on the current position and orientation of the first eye, an opacity value of at least a portion of the first distortion-corrected focus image frame and an opacity value of at least a portion of the first distortion-corrected context image frame, wherein a projection of said portion of the first distortion-corrected focus image frame is to be optically combined with a projection of said portion of the first distortion-corrected context image frame; and determine, based on the current position and orientation of the second eye, an opacity value of at least a portion of the second distortion-corrected focus image frame and an opacity value of at least a portion of the second distortion-corrected context image frame, wherein a projection of said portion of the second distortion-corrected focus image frame is to be optically combined with a projection of said portion of the second distortion-corrected context image frame.

Optionally, the portions of the first distortion-corrected focus and context image frames (for which the opacity values are to be determined) represent a same region of the visual scene in both the first distortion-corrected focus image frame and the first distortion-corrected context image frame, at different angular resolutions. Likewise, the portions of the second distortion-corrected focus and context image frames (for which the opacity values are to be determined) represent a same region of the visual scene in both the second distortion-corrected focus image frame and the second distortion-corrected context image frame, at different angular resolutions. In such a case, multiple display systems (namely, the first context display or projector and the first focus display or projector, and the second context display or projector and the second focus display or projector) provide foveated rendering within the display apparatus.

Optionally, an optical combination of a projection of a given portion of a given distortion-corrected focus image frame with a projection of a given portion of a given distortion-corrected context image frame results in blending of said given portions. In such a case, said given portions can be understood to be additively blended. Notably, a region of a given view corresponding to the optical combination of said portions would appear to have different blend distortions when viewed from various poses of a given eye. Therefore, optionally, opacity values of the given portions of the given distortion-corrected focus image frame and the given distortion-corrected context image frame are determined, based on a current pose of the given eye, in order to account for possible blend distortion that would be visible upon viewing said region of the given view from a perspective of the current pose of the given eye.

It will be appreciated that when the determined opacity values are applied to the given portions of the given distortion-corrected focus image frame and the given distortion-corrected context image frame, an optimal blend fading effect is achieved for the region of the given view corresponding to the optical combination of said portions. As a result, the given view appears seamless and realistic to the given eye. Such opacity adjustment can be understood to be a 'blending transformation'.

Optionally, the display apparatus further comprises at least one first actuator and at least one second actuator, wherein the processor is configured to:

control the at least one first actuator, based on the current position and orientation of the first eye, to adjust a location of the projection of the first distortion-corrected focus image frame with respect to a location of the projection of the first distortion-corrected context image frame on a surface of the first optical combiner; and control the at least one second actuator, based on the current position and orientation of the second eye, to adjust a location of the projection of the second distortion-corrected focus image frame with respect to a location of the projection of the second distortion-corrected context image frame on a surface of the second optical combiner.

In this regard, it will be appreciated that the location of the projection of the first distortion-corrected focus image frame is optionally adjusted with respect to the location of the projection of the first distortion-corrected context image frame to ensure that a portion of a combined projection of the first view that corresponds to the region of interest is incident upon a fovea of the first eye. Said adjustment is based on the current position and orientation of the first eye as the fovea of the first eye is a part of the first eye, and its position and orientation changes with change in position and orientation of the first eye.

Likewise, the location of the projection of the second distortion-corrected focus image frame is optionally adjusted with respect to the location of the projection of the second distortion-corrected context image frame to ensure that a portion of a combined projection of the second view that corresponds to the region of interest is incident upon a fovea of the second eye. Said adjustment is based on the current position and orientation of the second eye as the fovea of the second eye is a part of the second eye, and its position and orientation changes with change in position and orientation of the second eye.

Throughout the present disclosure, the term "actuator" refers to equipment (for example, such as electrical components, mechanical components, magnetic components, polymeric components, and so forth) that is employed to move its associated component. The at least one actuator is controlled to move its associated component by at least one of: displacement of said component, rotation of said component, tilting of said component. Notably, the at least one actuator is driven by an actuation signal. It will be appreciated that the actuation signal could be a mechanical torque, an electric current, a hydraulic pressure, a pneumatic pressure, and the like.

Optionally, the location of the projection of the first distortion-corrected focus image frame is adjusted with respect to the location of the projection of the first distortion-corrected context image frame on the surface of the first optical combiner by at least one of:

moving the at least one first focus display or projector with respect to the first optical combiner, moving at least one first optical element with respect to the at least one first focus display or projector, the at least one first optical element being positioned on an optical path between the first optical combiner and the at least one first focus display or projector, moving the first optical combiner.

It will be appreciated that such movements are made via the at least one first actuator, and encompass translational movements, rotation movements, tilt movements, and the like.

Optionally, the location of the projection of the second distortion-corrected focus image frame is adjusted with respect to the location of the projection of the second distortion-corrected context image frame on the surface of the second optical combiner by at least one of:

moving the at least one second focus display or projector with respect to the second optical combiner, moving at least one second optical element with respect to the at least one second focus display or projector, the at least one second optical element being positioned on an optical path between the second optical combiner and the at least one second focus display or projector, moving the second optical combiner.

It will be appreciated that such movements are made via the at least one second actuator, and encompass translational movements, rotation movements, tilt movements, and the like.

Optionally, the processor or the at least one external processor is configured to determine, based on the current position and orientation of the first eye and the current position and orientation of the second eye, at least one first occluded area of the at least one first distortion-corrected image frame and at least one second occluded area of the at least one second distortion-corrected image frame, respectively, wherein the processor is configured to:

control the at least one first display or projector to render only an area of the at least one first distortion-corrected image frame other than the at least one first occluded area; and control the at least one second display or projector to render only an area of the at least one second distortion-corrected image frame other than the at least one second occluded area.

Throughout the present disclosure, the term "occluded area" refers to an area of a given distortion-corrected image frame that cannot be seen by a given eye of the user. Typically, the occluded area of the given distortion-corrected image frame lies along a periphery of the given distortion-corrected image frame, and the occluded area is not rendered as it cannot be seen by the given eye. It will be appreciated that different poses of the given eye correspond to different perspectives with which the given eye views the given distortion-corrected image frame. Therefore, at least one given occluded area is determined based on a current pose of the given eye, to accurately correspond to a current perspective of the given eye (from the current pose of the given eye).

It will be appreciated that as the at least one first and second occluded areas are not to be rendered, better rendering performance is achieved while rendering only selective areas of the at least one first distortion-corrected image frame and the at least one second distortion-corrected image frame. As an example, rendering time is reduced when rendering only said selective areas, since only required visual information is to be rendered, and not an entirety of the available visual information.

Optionally, when controlling the at least one first display or projector to render selective areas of the at least one first distortion-corrected image frame, the processor is configured to fill a render buffer of the at least one first display or projector with only the area of the at least one first distortion-corrected image frame other than the at least one first occluded area. Likewise, optionally, when controlling the at least one second display or projector to render selective areas of the at least one second distortion-corrected image frame, the processor is configured to fill a render buffer of the at least one second display or projector with only the area of the at least one second distortion-corrected image frame other than the at least one second occluded area. Notably, the processor determines an optimal size of the aforesaid render buffers, based on sizes of the first occluded area and the second occluded area. This reduces unwanted processing burden on the render buffers.

The present disclosure also relates to the method as described above. Various embodiments and variants disclosed above apply mutatis mutandis to the method.

Optionally, in the method, the step of determining a given transformation comprises determining, based on a current position and orientation of a given eye relative to a given optical axis of a given portion of the display apparatus, a given two-dimensional offset by which a given pixel of a given input image frame is to be shifted spatially to generate a corresponding pixel of a corresponding distortion-corrected image frame.

Optionally, in the method, the given two-dimensional offset is determined separately for each color channel of the given pixel, based on an amount of wavelength-related aberration.

Optionally, in the method, the step of determining a given transformation comprises determining, based on a current position and orientation of a given eye relative to a given optical axis of a given portion of the display apparatus, a color-correction factor per color channel of a given pixel of a given input image frame, wherein the color-correction factor, when applied to the given pixel, changes per-color-channel pixel values of the given pixel.

Optionally, in the method, the at least one first display or projector comprises a first context display or projector and a first focus display or projector, and the at least one second display or projector comprises a second context display or projector and a second focus display or projector, the at least one first distortion-corrected image frame comprising a first distortion-corrected context image frame and a first distortion-corrected focus image frame for rendering at the first context display or projector and the first focus display or projector, respectively, the at least one second distortion-corrected image frame comprising a second distortion-corrected context image frame and a second distortion-corrected focus image frame for rendering at the second context display or projector and the second focus display or projector, respectively, wherein the display apparatus further comprises a first optical combiner and a second optical combiner, the method further comprising:

optically combining, via the first optical combiner, a projection of the first distortion-corrected context image frame with a projection of the first distortion-corrected focus image frame to present a first view to the first eye; and optically combining, via the second optical combiner, a projection of the second distortion-corrected context image frame with a projection of the second distortion-corrected focus image frame to present a second view to the second eye.

Optionally, the method further comprises:

determining, based on the current position and orientation of the first eye, an opacity value of at least a portion of the first distortion-corrected focus image frame and an opacity value of at least a portion of the first distortion-corrected context image frame, wherein a projection of said portion of the first distortion-corrected focus image frame is optically combined with a projection of said portion of the first distortion-corrected context image frame; and determining, based on the current position and orientation of the second eye, an opacity value of at least a portion of the second distortion-corrected focus image frame and an opacity value of at least a portion of the second distortion-corrected context image frame, wherein a projection of said portion of the second distortion-corrected focus image frame is optically combined with a projection of said portion of the second distortion-corrected context image frame.

Optionally, the method further comprises:

adjusting, based on the current position and orientation of the first eye, a location of the projection of the first distortion-corrected focus image frame with respect to a location of the projection of the first distortion-corrected context image frame on a surface of the first optical combiner; and adjusting, based on the current position and orientation of the second eye, a location of the projection of the second distortion-corrected focus image frame with respect to a location of the projection of the second distortion-corrected context image frame on a surface of the second optical combiner.

Optionally, the method further comprises:

determining, based on the current position and orientation of the first eye and the current position and orientation of the second eye, at least one first occluded area of the at least one first distortion-corrected image frame and at least one second occluded area of the at least one second distortion-corrected image frame, respectively;

controlling the at least one first display or projector to render only a remaining area of the at least one first distortion-corrected image frame other than the at least one first occluded area; and controlling the at least one second display or projector to render only a remaining area of the at least one second distortion-corrected image frame other than the at least one second occluded area.

DETAILED DESCRIPTION OF THE DRAWINGS

Referring to FIG. 1, illustrated is a block diagram of an architecture of a display apparatus 100, in accordance with an embodiment of the present disclosure. The display apparatus 100 comprises at least one first display or projector (depicted as a first display or projector 102), at least one second display or projector (depicted as a second display or projector 104), a first portion (not shown) and a second portion (not shown), means 106 for tracking a position and orientation of a first eye and a position and orientation of a second eye, and a processor 108. The processor 108 is coupled to the first display or projector 102, the second display or projector 104 and said means 106. The first display or projector 102, in operation, displays first images to be presented to a first eye of a user. The second display or projector 104, in operation, displays second images to be presented to a second eye of the user. The first portion and the second portion are arranged to face the first eye and the second eye, respectively. The first portion and the second portion have a first optical axis and a second optical axis, respectively. Said means 106 for tracking tracks the position and orientation of the first eye and a position and orientation of the second eye relative to the first optical axis and the second optical axis, respectively.

The processor 108 or at least one external processor (depicted as an external processor 110) communicably coupled to the processor 108 is configured to:

obtain a current position and orientation of the first eye and a current position and orientation of the second eye relative to the first optical axis and the second optical axis, respectively;

determine at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector; and apply the at least one first transformation and the at least one second transformation to the at least one first input image frame and the at least one second input image frame to generate at least one first distortion-corrected image frame and at least one second distortion-corrected image frame, respectively, wherein the processor 108 is configured to render the at least one first distortion-corrected image frame and the at least one second distortion-corrected image frame via the first display or projector 102 and the second display or projector 104, respectively.

Figure 2:
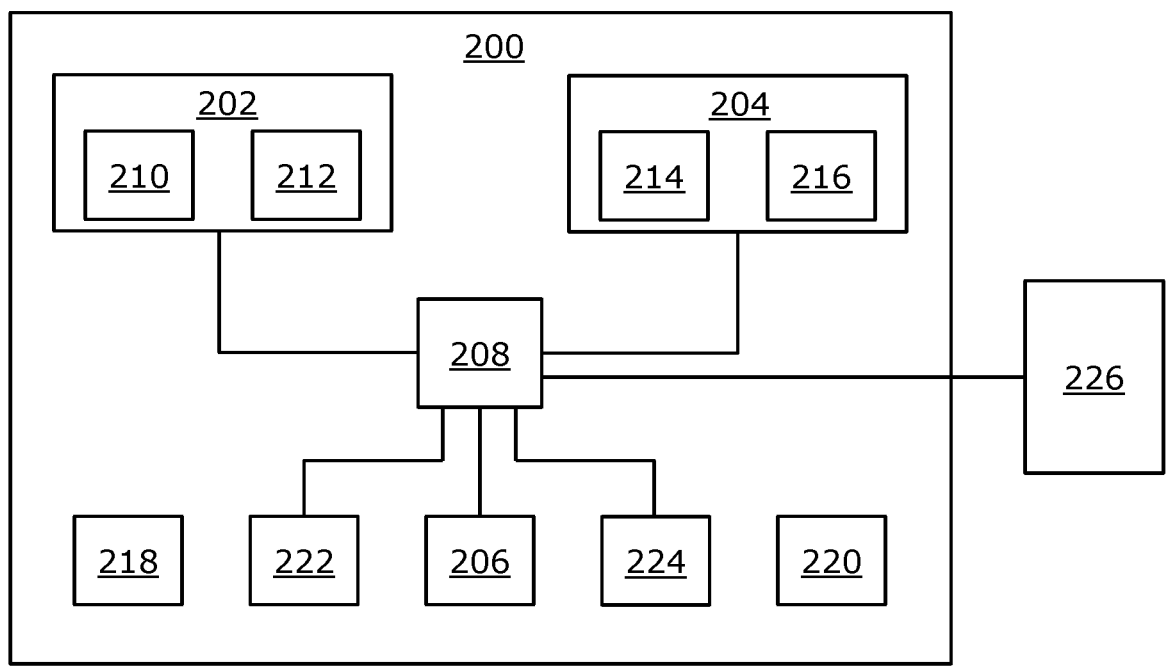

Referring to FIG. 2, illustrated is a block diagram of an architecture of a display apparatus 200, in accordance with another embodiment of the present disclosure. The display apparatus 200 comprises at least one first display or projector (depicted as a first display or projector 202), at least one second display or projector (depicted as a second display or projector 204), a first portion (not shown) and a second portion (not shown), means 206 for tracking a position and orientation of a first eye and a position and orientation of a second eye, and a processor 208. The first display or projector 202 further comprises a first context display or projector 210 and a first focus display or projector 212. The second display or projector 204 further comprises a second context display or projector 214 and a second focus display or projector 216. The display apparatus 200 further comprises a first optical combiner 218, a second optical combiner 220, at least one first actuator (depicted as a first actuator 222), and at least one second actuator (depicted as a second actuator 224). The processor 208 is communicably coupled to the first display or projector 202, the second display or projector 204, the means 206, and at least one external processor (depicted as an external processor 226). The processor 208 is further communicably coupled to the first actuator 222 and the second actuator 224.

It may be understood by a person skilled in the art that FIG. 1 and FIG. 2 include simplified architectures of the display apparatus 100 and 200, respectively, for sake of clarity, which should not unduly limit the scope of the claims herein. The person skilled in the art will recognize many variations, alternatives, and modifications of embodiments of the present disclosure.

Figure 3:
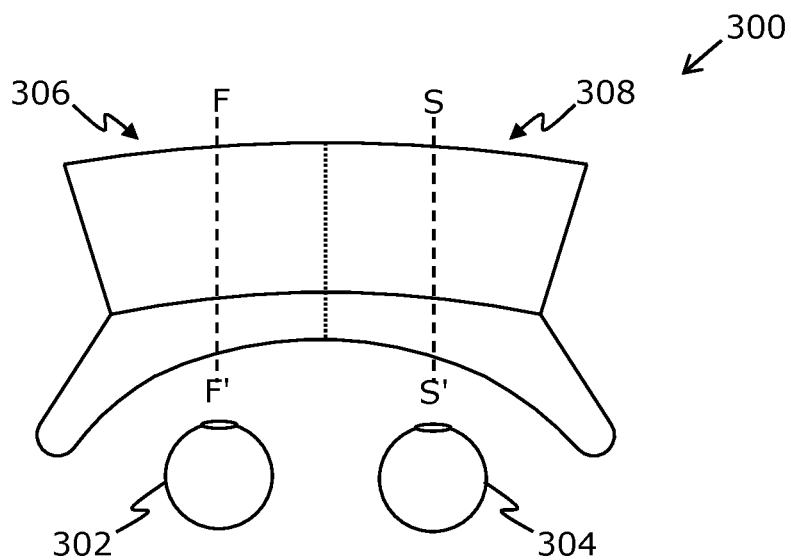
FIG. 3 is a schematic illustration of an arrangement of a display apparatus with respect to a first eye and a second eye of a user, in accordance with an embodiment of the present disclosure.

Referring to FIG. 3, illustrated is a schematic illustration of an arrangement of a display apparatus 300 with respect to a first eye 302 and a second eye 304 of a user, in accordance with an embodiment of the present disclosure. The display apparatus 300 comprises a first portion 306 and a second portion 308. When the display apparatus 300 in operation is worn by the user, the first portion 306 and the second portion 308 are arranged to face the first eye 302 and the second eye 304, respectively. The first portion 306 and the second portion 308 have a first optical axis F-F' and a second optical axis S-S', respectively.

Figure 4A:
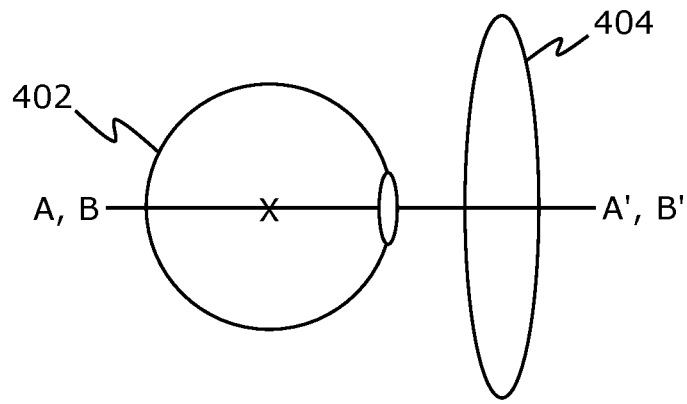
Figure 4B:
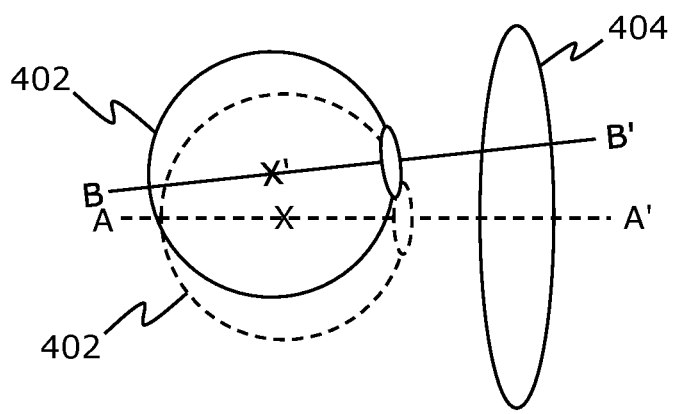
FIG. 4B is a schematic illustration of a suboptimal position and orientation of the given eye relative to the given optical axis, in accordance with an embodiment of the present disclosure.

Referring to FIGS. 4A and 4B, FIG. 4A is a schematic illustration of an optimal position and orientation of a given eye 402 relative to a given optical axis A-A', whereas FIG. 4B is a schematic illustration of a suboptimal position and orientation of the given eye 402 relative to the given optical axis A-A', in accordance with an embodiment of the present disclosure. It may be understood by person skilled in the art that the FIGS. 4A and 4B represent exemplary schematic illustrations, which should not unduly limit the scope of the claims herein. The person skilled in the art will recognize many variations, alternatives, and modifications of embodiments of the present disclosure.

In both FIGS. 4A and 4B, the given optical axis A-A' corresponds to a given portion of a display apparatus, wherein the given portion houses several optical components 404 of the display apparatus that correspond to the given eye 402.

In FIG. 4A, the given eye 402 is positioned at the optimal position (notably, a position X lying on the given optical axis A-A') and is oriented at the optimal orientation (notably, when an optical axis B-B' of the given eye 402 is aligned to the given optical axis A-A') relative to the given optical axis A-A'.

In FIG. 4B, the given eye 402 is positioned at the suboptimal position (notably, a position X' not lying on the given optical axis A-A') and is oriented at a suboptimal orientation (notably, when the optical axis B-B' of the given eye 402 is not aligned to the given optical axis A-A') relative to the given optical axis A-A'.

Figure 5A:
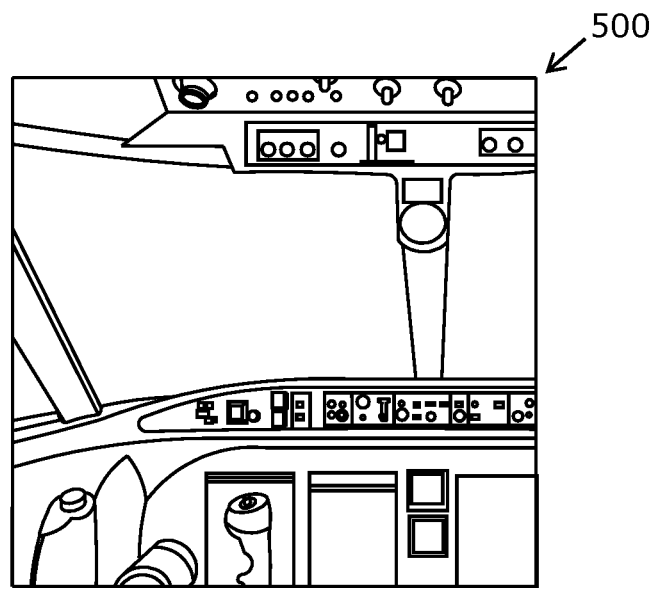
FIG. 5A is an exemplary illustration of an input image frame.
Figure 5B:
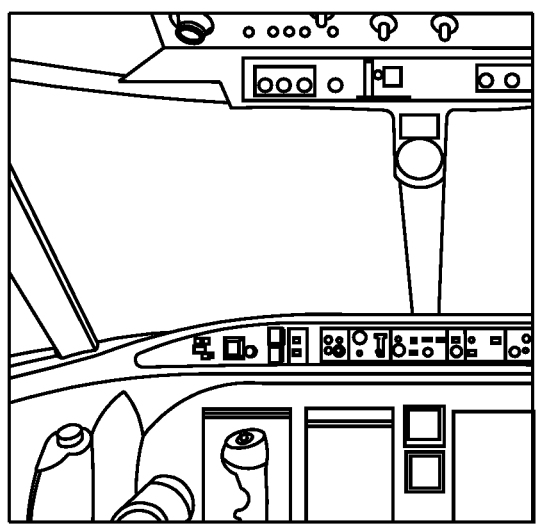
FIG. 5B is an exemplary illustration of a view of the input image frame that is visible to a given eye when the given eye is at an optimal position and orientation relative to its corresponding optical axis.
Figure 5C:
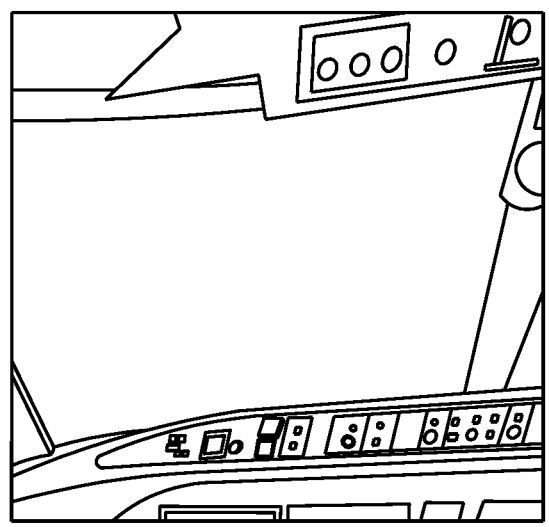
FIG. 5C is an exemplary illustration of a view of the input image frame that is visible to the given eye when the given eye is at an exemplary suboptimal position and orientation relative to its corresponding optical axis, in accordance with an embodiment of the present disclosure.

Referring to FIGS. 5A, 5B and 5C, FIG. 5A is an exemplary illustration of an input image frame 500, FIG. 5B is an exemplary illustration of a view of the input image frame 500 that is visible to a given eye when the given eye is at an optimal position and orientation relative to its corresponding optical axis, and FIG. 5C is an exemplary illustration of a view of the input image frame 500 that is visible to the given eye when the given eye is at an exemplary suboptimal position and orientation relative to its corresponding optical axis, in accordance with an embodiment of the present disclosure. It may be understood by person skilled in the art that the FIGS. 5A, 5B and 5C represent exemplary schematic illustrations, which should not unduly limit the scope of the claims herein. The person skilled in the art will recognize many variations, alternatives, and modifications of embodiments of the present disclosure.

In FIG. 5A, the input image frame 500 depicts an airplane cockpit. Notably, a front panel and a top panel of the airplane cockpit are represented in the input image frame 500. Both the front panel and the top panel include several controllers (depicted, for example, as circles and rectangles).

The view shown in FIG. 5B is visible to the given eye when the given eye is at the optimal position and orientation relative to its corresponding optical axis and the input image frame 500 is rendered at the display apparatus. The view accurately and sufficiently depicts the airplane cockpit of the input image frame 500. In other words, the view is same as a view of the airplane cockpit depicted in the input image frame 500.

The view shown in FIG. 5C is visible to the given eye when the given eye is at the suboptimal position and orientation relative to its corresponding optical axis and the input image frame 500 is rendered at the display apparatus. The view inaccurately and insufficiently depicts the airplane cockpit of the input image frame 500. Notably, the front panel and the top panel are only partly visible in the view, their sizes are inaccurately represented, and their shapes are distorted. Moreover, shapes and sizes of the controllers are also inaccurately depicted (for example, 3 controllers of a set in the top panel have a circular shape and small size in the input image frame 500 of FIG. 5A, whereas the same 3 controllers in the top panel have an elliptical shape and large size in the view of FIG. 5C).

Figure 6A:
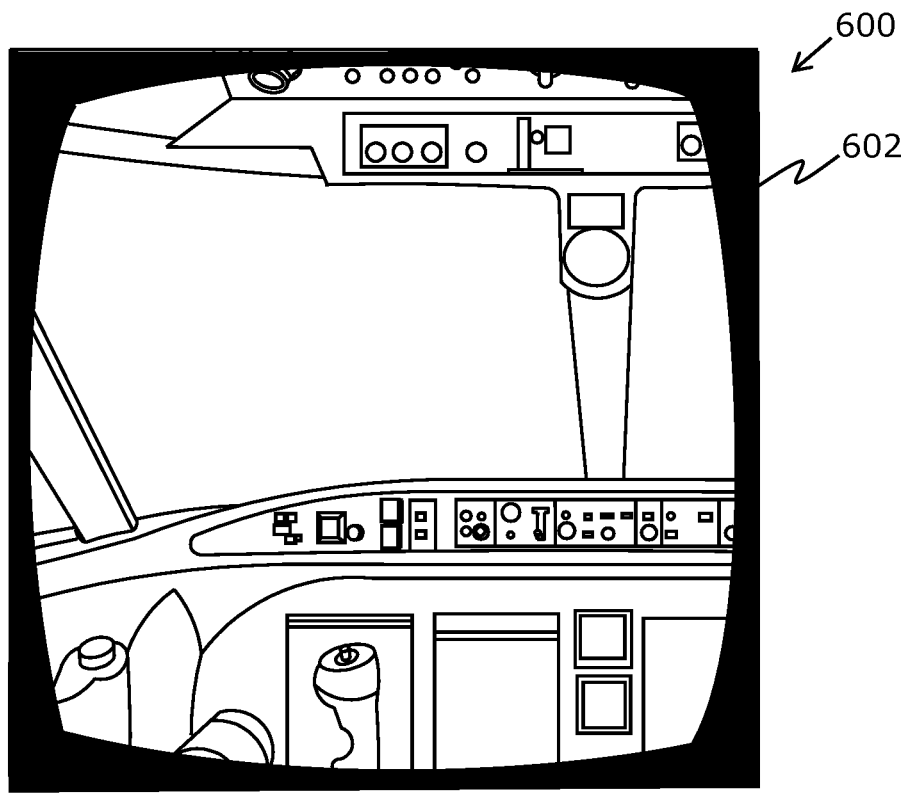
Figure 6B:
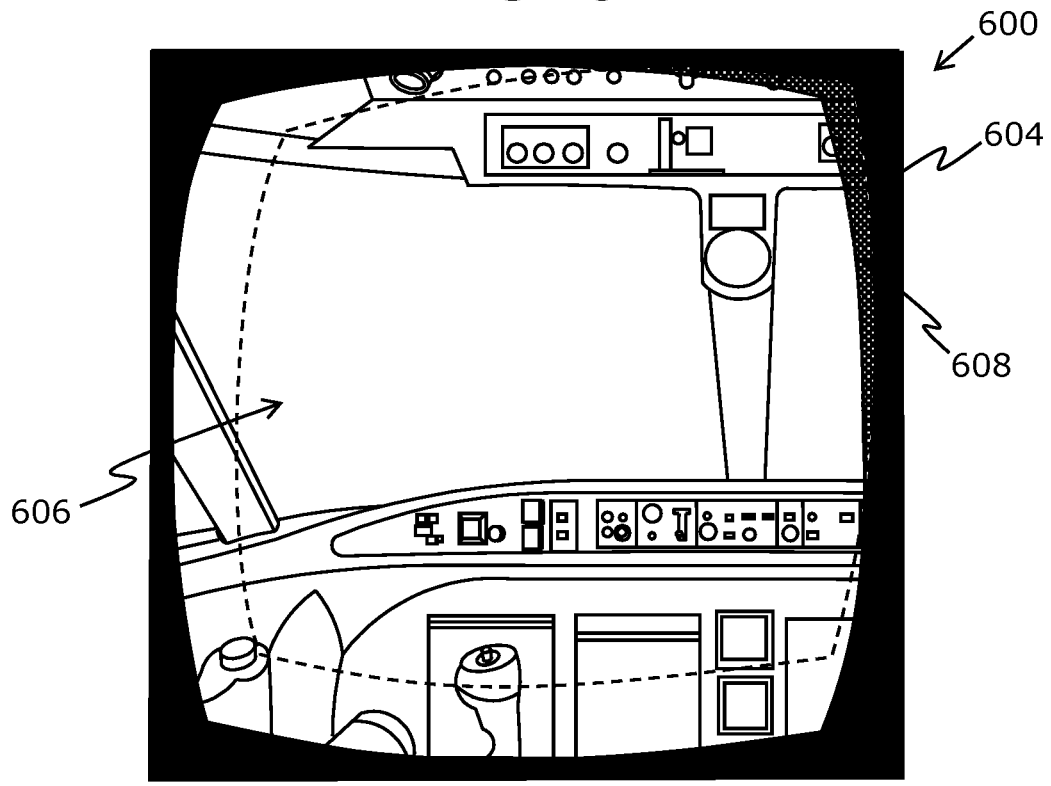
FIG. 6B is an exemplary illustration of a given occluded area of the given input image frame when the given eye is at a suboptimal position and orientation relative to its corresponding optical axis, in accordance with an embodiment of the present disclosure.

Referring to FIGS. 6A and 6B, FIG. 6A is an exemplary illustration of a given occluded area 602 of a given input image frame 600 when a given eye of a user is at an optimal position and orientation relative to its corresponding optical axis, whereas FIG. 6B is an exemplary illustration of a given occluded area 604 of the given input image frame 600 when the given eyes is at a suboptimal position and orientation relative to its corresponding optical axis, in accordance with an embodiment of the present disclosure. It may be understood by person skilled in the art that the FIGS. 6A and 6B represent exemplary schematic illustrations, which should not unduly limit the scope of the claims herein. The person skilled in the art will recognize many variations, alternatives, and modifications of embodiments of the present disclosure.

In both FIGS. 6A and 6B, the given input image frame 600 is considered to be rendered at the display apparatus without any distortion correction.

When the given eye is at the optimal position and orientation relative to its corresponding optical axis, the occluded area 602 of FIG. 6A is optimally shaped and placed within the given input image frame 600. Notably, only a region of the given input image frame 600 other than the occluded area 602 is visible to the user and is rendered at the display apparatus. The occluded area 602 is not rendered at the display apparatus.

When the given eye is at the suboptimal position and orientation relative to its corresponding optical axis, the occluded area 604 of FIG. 6B is sub-optimally shaped and placed within the given input image frame 600. Notably, a portion 606 of the given input image frame 600 that lies within a dashed boundary would be visible to the user. As the occluded area 604 is suboptimal, a sub-portion 608 (depicted as a dotted region) of the portion 606 that belongs to the occluded area 604 would not be rendered. In order to show the sub-portion 608 to the user, either the occluded area 604 is to be optimally reshaped for the given input image frame 600 to exclude the sub-portion 608, or the given input image frame 600 is to be distortion corrected prior to rendering.

Figure 7:
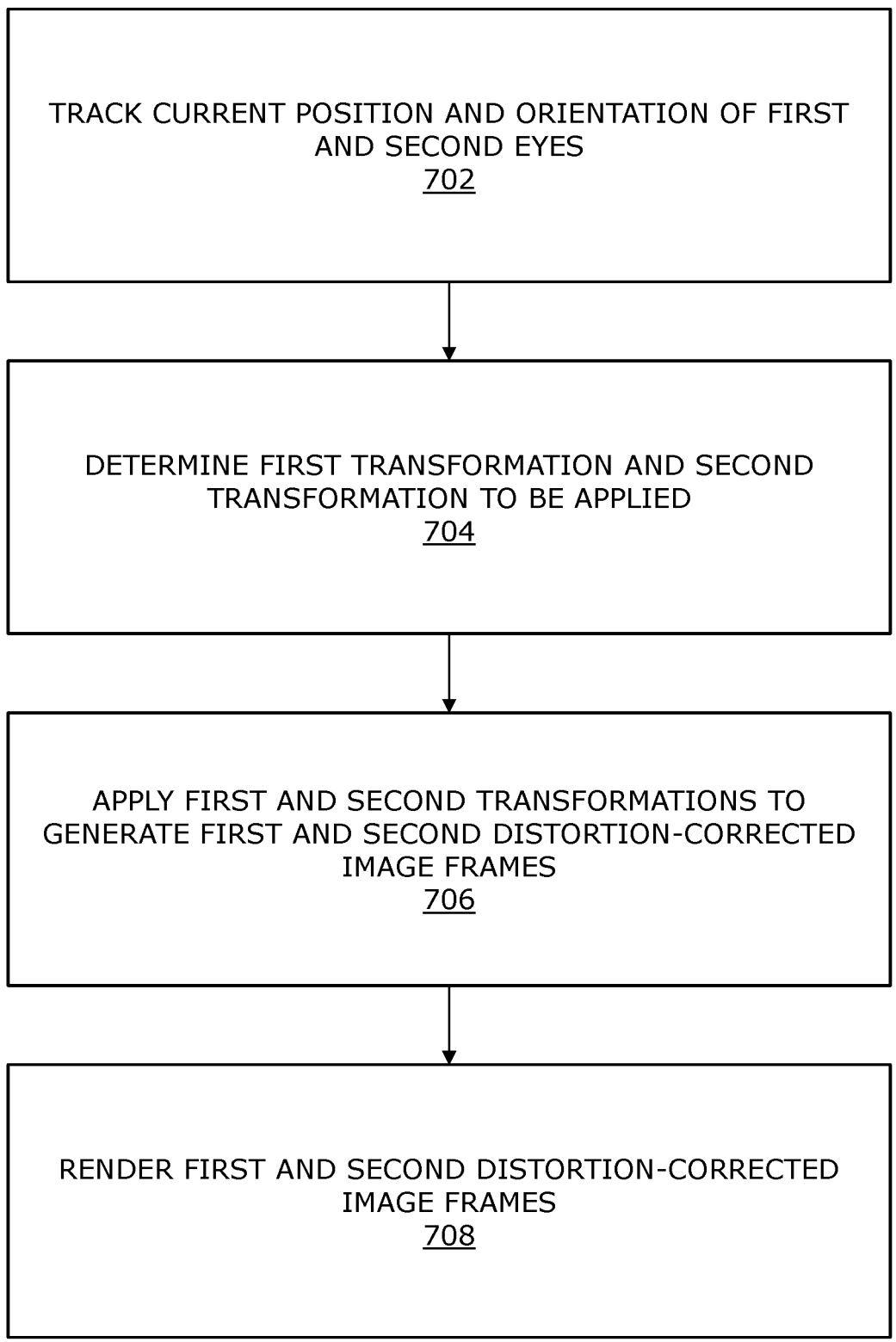
FIG. 7 illustrates steps of a method of correcting image distortion for a display apparatus, in accordance with an embodiment of the present disclosure.

Referring to FIG. 7, illustrated are steps of a method of correcting image distortion for a display apparatus, in accordance with an embodiment of the present disclosure. The display apparatus comprises at least one first display or projector, at least one second display or projector, and a first portion and a second portion arranged to face a first eye and a second eye of a user, respectively, the first portion and the second portion having a first optical axis and a second optical axis, respectively. At step 702, a current position and orientation of the first eye and a current position and orientation of the second eye are tracked relative to the first optical axis and the second optical axis, respectively. At step 704, at least one first transformation to be applied to at least one first input image frame and at least one second transformation to be applied to at least one second input image frame are determined based on the current position and orientation of the first eye and the current position and orientation of the second eye, respectively. A given transformation is to be applied to correct apparent per-pixel distortions that are produced when a given input image frame is displayed at a given display or projector. At step 706, the at least one first transformation and the at least one second transformation are applied to the at least one first input image frame and the at least one second input image frame to generate at least one first distortion-corrected image frame and at least one second distortion-corrected image frame, respectively. At step 708, the at least one first distortion-corrected image frame and the at least one second distortion-corrected image frame are rendered via the at least one first display or projector and the at least one second display or projector, respectively.

The steps 702 to 708 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   at least one first display or projector that, in operation, displays first images to be presented to a first eye of a user;
   at least one second display or projector that, in operation, displays second images to be presented to a second eye of the user;
   a first portion and a second portion that are arranged to face the first eye and the second eye, respectively, the first portion and the second portion having a first optical axis and a second optical axis, respectively;
   means for tracking a position and orientation of the first eye and a position and orientation of the second eye relative to the first optical axis and the second optical axis, respectively; and
   a processor coupled to the at least one first display or projector, the at least one second display or projector and said means, wherein the processor or at least one external processor communicably coupled to the processor is configured to:
      obtain a current position and orientation of the first eye and a current position and orientation of the second eye relative to the first optical axis and the second optical axis, respectively;
      determine at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector; and
      apply the at least one first transformation and the at least one second transformation to the at least one first input image frame and the at least one second input image frame to generate at least one first distortion-corrected image frame and at least one second distortion-corrected image frame, respectively,
   wherein the processor is configured to render the at least one first distortion-corrected image frame and the at least one second distortion-corrected image frame via the at least one first display or projector and the at least one second display or projector, respectively,
   wherein, when determining a given transformation, the processor or the at least one external processor is configured to determine, based on a current position and orientation of a given eye relative to a given optical axis of a given portion of the display apparatus, a given two-dimensional offset by which a given pixel of a given input image frame is to be shifted spatially to generate a corresponding pixel of a corresponding distortion-corrected image frame,
   and wherein the given two-dimensional offset is to be determined separately for each color channel of the given pixel, based on an amount of wavelength-related aberration.

2. The display apparatus of claim 1, wherein, when determining a given transformation, the processor or the at least one external processor is configured to determine, based on a current position and orientation of a given eye relative to a given optical axis of a given portion of the display apparatus, a color-correction factor per color channel of a given pixel of a given input image frame, wherein the color-correction factor, when applied to the given pixel, changes per-color-channel pixel values of the given pixel.

3. The display apparatus of claim 1, wherein the at least one first display or projector comprises a first context display or projector and a first focus display or projector, and the at least one second display or projector comprises a second context display or projector and a second focus display or projector, the at least one first distortion-corrected image frame comprising a first distortion-corrected context image frame and a first distortion-corrected focus image frame to be rendered at the first context display or projector and the first focus display or projector, respectively, the at least one second distortion-corrected image frame comprising a second distortion-corrected context image frame and a second distortion-corrected focus image frame to be rendered at the second context display or projector and the second focus display or projector, respectively, wherein the display apparatus further comprises:
   a first optical combiner arranged to optically combine a projection of the first distortion-corrected context image frame with a projection of the first distortion-corrected focus image frame to present a first view to the first eye; and
   a second optical combiner arranged to optically combine a projection of the second distortion-corrected context image frame with a projection of the second distortion-corrected focus image frame to present a second view to the second eye.

4. The display apparatus of claim 3, wherein the processor or the at least one external processor is configured to:
   determine, based on the current position and orientation of the first eye, an opacity value of at least a portion of the first distortion-corrected focus image frame and an opacity value of at least a portion of the first distortion-corrected context image frame, wherein a projection of said portion of the first distortion-corrected focus image frame is to be optically combined with a projection of said portion of the first distortion-corrected context image frame; and determine, based on the current position and orientation of the second eye, an opacity value of at least a portion of the second distortion-corrected focus image frame and an opacity value of at least a portion of the second distortion-corrected context image frame, wherein a projection of said portion of the second distortion-corrected focus image frame is to be optically combined with a projection of said portion of the second distortion-corrected context image frame.

5. The display apparatus of claim 3, further comprising at least one first actuator and at least one second actuator, wherein the processor is configured to:

control the at least one first actuator, based on the current position and orientation of the first eye, to adjust a location of the projection of the first distortion-corrected focus image frame with respect to a location of the projection of the first distortion-corrected context image frame on a surface of the first optical combiner; and control the at least one second actuator, based on the current position and orientation of the second eye, to adjust a location of the projection of the second distortion-corrected focus image frame with respect to a location of the projection of the second distortion-corrected context image frame on a surface of the second optical combiner.

6. The display apparatus of claim 1, wherein the processor or the at least one external processor is configured to determine, based on the current position and orientation of the first eye and the current position and orientation of the second eye, at least one first occluded area of the at least one first distortion-corrected image frame and at least one second occluded area of the at least one second distortion-corrected image frame, respectively, wherein the processor is configured to:
control the at least one first display or projector to render only an area of the at least one first distortion-corrected image frame other than the at least one first occluded area; and
control the at least one second display or projector to render only an area of the at least one second distortion-corrected image frame other than the at least one second occluded area.

7. A method of correcting image distortion for a display apparatus, the display apparatus comprising at least one first display or projector, at least one second display or projector, and a first portion and a second portion arranged to face a first eye and a second eye of a user, respectively, the first portion and the second portion having a first optical axis and a second optical axis, respectively, the method comprising:

tracking a current position and orientation of the first eye and a current position and orientation of the second eye relative to the first optical axis and the second optical axis, respectively;

determining at least one first transformation to be applied to at least one first input image frame and at least one second transformation to be applied to at least one second input image frame, based on the current position and orientation of the first eye and the current position and orientation of the second eye, respectively, wherein a given transformation is to be applied to correct apparent per-pixel distortions that are produced when a given input image frame is displayed at a given display or projector;

applying the at least one first transformation and the at least one second transformation to the at least one first input image frame and the at least one second input image frame to generate at least one first distortion-corrected image frame and at least one second distortion-corrected image frame, respectively; and rendering the at least one first distortion-corrected image frame and the at least one second distortion-corrected image frame via the at least one first display or projector and the at least one second display or projector, respectively wherein the step of determining a given transformation comprises determining, based on a current position and orientation of a given eye relative to a given optical axis of a given portion of the display apparatus, a given two-dimensional offset by which a given pixel of a given input image frame is to be shifted spatially to generate a corresponding pixel of a corresponding distortion-corrected image frame, and wherein the given two-dimensional offset is determined separately for each color channel of the given pixel, based on an amount of wavelength-related aberration.

8. The method of claim 7, wherein the step of determining a given transformation comprises determining, based on a current position and orientation of a given eye relative to a given optical axis of a given portion of the display apparatus, a color-correction factor per color channel of a given pixel of a given input image frame, wherein the color-correction factor, when applied to the given pixel, changes per-color-channel pixel values of the given pixel.

9. The method of claim 7, wherein the at least one first display or projector comprises a first context display or projector and a first focus display or projector, and the at least one second display or projector comprises a second context display or projector and a second focus display or projector, the at least one first distortion-corrected image frame comprising a first distortion-corrected context image frame and a first distortion-corrected focus image frame for rendering at the first context display or projector and the first focus display or projector, respectively, the at least one second distortion-corrected image frame comprising a second distortion-corrected context image frame and a second distortion-corrected focus image frame for rendering at the second context display or projector and the second focus display or projector, respectively, wherein the display apparatus further comprises a first optical combiner and a second optical combiner, the method further comprising:

optically combining, via the first optical combiner, a projection of the first distortion-corrected context image frame with a projection of the first distortion-corrected focus image frame to present a first view to the first eye; and optically combining, via the second optical combiner, a projection of the second distortion-corrected context image frame with a projection of the second distortion-corrected focus image frame to present a second view to the second eye.

10. The method of claim 9, further comprising:

determining, based on the current position and orientation of the first eye, an opacity value of at least a portion of the first distortion-corrected focus image frame and an opacity value of at least a portion of the first distortion-corrected context image frame, wherein a projection of said portion of the first distortion-corrected focus image frame is optically combined with a projection of said portion of the first distortion-corrected context image frame; and determining, based on the current position and orientation of the second eye, an opacity value of at least a portion of the second distortion-corrected focus image frame and an opacity value of at least a portion of the second distortion-corrected context image frame, wherein a projection of said portion of the second distortion-corrected focus image frame is optically combined with a projection of said portion of the second distortion-corrected context image frame.

11. The method of claim 9, further comprising:

adjusting, based on the current position and orientation of the first eye, a location of the projection of the first distortion-corrected focus image frame with respect to a location of the projection of the first distortion-corrected context image frame on a surface of the first optical combiner; and adjusting, based on the current position and orientation of the second eye, a location of the projection of the second distortion-corrected focus image frame with respect to a location of the projection of the second distortion-corrected context image frame on a surface of the second optical combiner.

12. The method of claim 7, further comprising:

determining, based on the current position and orientation of the first eye and the current position and orientation of the second eye, at least one first occluded area of the at least one first distortion-corrected image frame and at least one second occluded area of the at least one second distortion-corrected image frame, respectively;

controlling the at least one first display or projector to render only a remaining area of the at least one first distortion-corrected image frame other than the at least one first occluded area; and controlling the at least one second display or projector to render only a remaining area of the at least one second distortion-corrected image frame other than the at least one second occluded area.

* * * * *